(12) United States Patent
Jiang et al.

(10) Patent No.: US 9,967,832 B2
(45) Date of Patent: May 8, 2018

(54) SPECIAL PURPOSE MOBILE COMMUNICATION TERMINAL, SYSTEM AND METHOD

(71) Applicants: CHINA NUCLEAR POWER ENGINEERING CO., LTD., Shenzhen (CN); CHINA GENERAL NUCLEAR POWER GROUP, Shenzhen (CN)

(72) Inventors: Shang yue Jiang, Shenzhen (CN); Wei jia Yang, Shenzhen (CN); Qi Pan, Shenzhen (CN)

(73) Assignees: CHINA NUCLEAR POWER ENGINEERING CO., LTD., Shenzhen (CN); CHINA GENERAL NUCLEAR POWER GROUP, Shenzhen (CN)

( * ) Notice: Subject to any disclaimer, the term of this patent is extended or adjusted under 35 U.S.C. 154(b) by 259 days.

(21) Appl. No.: 14/504,179

(22) Filed: Oct. 1, 2014

(65) Prior Publication Data
US 2016/0100371 A1 Apr. 7, 2016

(51) Int. Cl.
| | |
|---|---|
| *H04W 52/24* | (2009.01) |
| *H04W 52/40* | (2009.01) |
| *H04W 52/12* | (2009.01) |
| *H04W 52/50* | (2009.01) |
| *H04W 52/36* | (2009.01) |
| *H04W 52/14* | (2009.01) |
| *H04B 17/23* | (2015.01) |

(52) U.S. Cl.
CPC ......... *H04W 52/245* (2013.01); *H04W 52/12* (2013.01); *H04W 52/146* (2013.01); *H04W 52/246* (2013.01); *H04W 52/367* (2013.01); *H04W 52/40* (2013.01); *H04W 52/50* (2013.01); *H04B 17/23* (2015.01)

(58) Field of Classification Search
CPC combination set(s) only.
See application file for complete search history.

(56) References Cited

U.S. PATENT DOCUMENTS

| | | | |
|---|---|---|---|
| 6,343,213 B1 * | 1/2002 | Steer | H04W 48/04 455/411 |
| 2005/0192038 A1 * | 9/2005 | Jeong | H04B 1/38 455/513 |

* cited by examiner

*Primary Examiner* — Ankur Jain
*Assistant Examiner* — Zhitong Chen
(74) *Attorney, Agent, or Firm* — Alston & Bird LLP

(57) ABSTRACT

A special purpose mobile communication terminal is provided. The special purpose mobile communication terminal includes: a receiver unit, configured to receive a first mobile communication signal and a second mobile communication signal respectively transmitted from base stations in a restricted area and an unrestricted area; and a control unit, configured to judge the mobile communication signals received by the receiver unit, the control unit being configured to reduce a transmitting power or not transmit an electromagnetic signal if the first mobile communication signal is received and a signal strength of the first communication signal is greater than a predetermined threshold value, and the control unit being configured to transmit an electromagnetic signal if the signal strength of the first mobile communication signal is less than the predetermined threshold value and the second mobile communication signal is received.

10 Claims, 2 Drawing Sheets

SPECIAL PURPOSE MOBILE COMMUNICATION TERMINAL, SYSTEM AND METHOD

BACKGROUND

Technical Field

The present application generally relates to mobile communication and, more particularly, relates to a special purpose mobile communication terminal, system and method.

Description of Related Art

With rapid development of electronics and communication technology, mobile communication technology has become increasingly popular and incredibly facilitates people's daily life. However, in some special situations, for instance, in a nuclear power plant, according to safety management regulations, mobile communication terminals which transmit wireless signals (e.g. personal handy-phone system (PHS) and mobile phone) are not allowed to be brought into the nuclear power plant. The mobile communication terminals which can transmit and receive wireless signals are bidirectional communication terminals which can cause electromagnetic interference on primary nuclear instruments, secondary protection instruments and DCS systems.

In order to avoid electromagnetic interference, most nuclear power plants adopt paging systems. However, due to outdated technology and simple function, paging systems can hardly meet the actual requirements of wireless communication in the nuclear power plants.

What is needed, therefore, is to provide a special purpose mobile communication terminal, system and method.

BRIEF SUMMARY

One object of the present invention is to provide a special purpose mobile communication terminal, system and method.

According to one embodiment of the present invention, a special purpose mobile communication terminal is provided. The special purpose mobile communication terminal includes:

a receiver unit, configured to receive a first mobile communication signal and a second mobile communication signal respectively transmitted from base stations in a restricted area and a unrestricted area; and a control unit, configured to judge mobile communication signals received by the receiver unit, the control unit being configured to reduce a transmitting power or not transmit electromagnetic signals if a first mobile communication signal is received and a signal field strength of the first mobile communication signal is greater than a predetermined threshold value; and the control unit being configured to transmit electromagnetic signals if the signal field strength of the first mobile communication signal is less than the predetermined threshold value and a second mobile communication signal is received.

According to one aspect of the special purpose mobile communication terminal according to the present invention, the control unit is configured to not transmit electromagnetic signals if the signal field strength of the first mobile communication signal is less than the predetermined threshold value and no second mobile communication signal is received.

When a user holding a special purpose mobile communication terminal of the present invention enters a restricted area, corresponding prompt message will be displayed on the screen of the special purpose mobile communication terminal. When a special purpose mobile communication terminal in the restricted area is called, the call cannot be connected. However, information, such as the phone number of the missed phone and the time of calling will be shown on the screen of the special purpose mobile communication terminal. Alternatively, the transmitting power in the restricted area is reduced to realize bidirectional communication at a relatively low transmitting power.

According to one aspect of the special purpose mobile communication terminal according to the present invention, the receiver unit receives data information transmitted from base stations in the restricted areas and the unrestricted areas, and the control unit controls display of the data information.

According to one aspect of the special purpose mobile communication terminal according to the present invention, the special purpose mobile communication terminal includes a communication interface being connected to an internet.

According to one aspect of the special purpose mobile communication terminal according to the present invention, the restricted area comprises a nuclear island, a conventional island, a recirculation pump house and a main switching station.

According to another embodiment of the present invention, a special purpose mobile communication system is provided. The special purpose mobile communication system includes:

a base station module, including stations respectively transmitting a first mobile communication signal and a second mobile communication signal in a restricted area and an unrestricted area; and a mobile terminal model, configured to receive mobile communication signals from the base station module and judge the mobile communication signals being received, the mobile terminal module being configured to reduce a transmitting power or not transmit electromagnetic signal if the first mobile communication signal is received and a signal strength of the first mobile communication signal is greater than a predetermined threshold value; and the mobile terminal module being configured to transmit an electromagnetic signal if the signal strength of the first mobile communication signal is less than the predetermined threshold value and the second mobile communication signal is received.

According to one aspect of the special purpose mobile communication system according to the present invention, the mobile terminal module is configured to not transmit the electromagnetic signal if the signal strength of the first mobile communication signal is less than the predetermined threshold value and no second mobile communication signal is received.

When a user holding a special purpose mobile communication terminal of the present invention enters a restricted area, corresponding prompt message is displayed on the screen of the special purpose mobile communication terminal. When a special purpose mobile communication terminal in the restricted area is called, the call cannot be connected. However, information, such as phone number of the missed phone and the time of calling will be shown on the screen of the special purpose mobile communication terminal. Alternatively, the transmitting power in the restricted area is reduced and bidirectional communication is realized at a relatively low transmitting power.

According to one aspect of the special purpose mobile communication system according to the present invention, the mobile terminal module is configured to receive data information transmitted from the base stations in the restricted area and the unrestricted area as well as display the data information.

According to one aspect of the special purpose mobile communication system according to the present invention, the restricted area comprises a nuclear island, a conventional island, a recirculation pump house and a main switching station.

According to yet another embodiment of the present invention, a special purpose mobile communication method is provided. The method includes the steps of:

receiving step: the mobile communication terminal receiving a first mobile communication signal and a second mobile communication signal respectively transmitted from base stations in a restricted area and an unrestricted area; and controlling step: judging the mobile communication signals being received, reducing a transmitting power or not transmitting the electromagnetic signals if the first mobile communication signal is received and a signal strength of the first mobile communication signal being received is greater than a predetermined threshold value, and transmitting electromagnetic signal if the signal strength of the first mobile communication signal is less than the predetermined threshold value and the second mobile communication signal is received.

According to one aspect of the special purpose mobile communication method according to the present invention, no electromagnetic signal is transmitted if the signal strength of the first mobile communication signal is less than the predetermined threshold value and no second mobile communication signal is received.

When a user holding a special purpose mobile communication terminal of the present invention enters a restricted area, corresponding prompt message is displayed on the screen of the special purpose mobile communication terminal. When a special purpose mobile communication terminal in the restricted area is called, the call cannot be connected. However, information, such as phone number of the missed phone and the time of calling will be shown on the screen of the special purpose mobile communication terminal. Alternatively, the transmitting power in the restricted area is reduced and bidirectional communication is realized at a relatively low transmitting power.

According to one aspect of the special purpose mobile communication method according to the present invention, in the receiving step, the mobile communication terminal receives data information transmitted from the base stations in the restricted and unrestricted area; and in the controlling step, the data information is displayed.

According to one aspect of the special purpose mobile communication method according to the present invention, the restricted area comprises a nuclear island, a conventional island, a recirculation pump house and a main switching station.

Compared with the prior art, the special purpose mobile communication terminal, system and method according to the present invention have the following advantages. When a user holding the special purpose mobile communication terminal of the present invention enters an unrestricted area from a restricted area or enters a restricted area from an unrestricted area, the special purpose mobile communication terminal can realize automatic shift. In the restricted area, the special purpose mobile communication terminal will not transmit signal and only has the paging function and, therefore, will not result in electromagnetic interference on electronic instruments and electrical equipments in the restricted area. Additionally, the special purpose mobile communication terminal can receive and transmit signal in the unrestricted area, thus realizing the two-way communication.

Other advantages and novel features will be drawn from the following detailed description of preferred embodiments with the attached drawings. The accompanying drawings, which are incorporated in and constitute a part of this specification, illustrate embodiments of the present invention and, together with a general description of the invention given above, and the detailed description of the embodiments given below, serve to explain the principles of the invention:

DETAILED DESCRIPTION OF VARIOUS EMBODIMENTS

Figure 1:
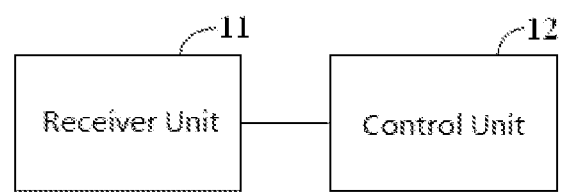
FIG. 1 depicts a schematic block diagram of a special purpose mobile communication terminal according to one embodiment of the present invention.

Example embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

FIG. 1 depicts an exemplary block diagram of a special purpose mobile communication terminal according to one embodiment of the present invention. The special purpose mobile communication terminal includes a receiver unit 11 and a control unit 12. The receiver unit 11 is configured to receive a first mobile communication signal and a second mobile communication signal respectively transmitted from base stations in a restricted area and an unrestricted area. The control unit 12 is configured to judge the mobile communication signals received by the receiver unit 11. In other words, the control unit 12 is configured to judge classification and signal strength of the mobile communication signals being received. If the first mobile communication signal is received and signal strength of the first mobile communication signal is greater than a predetermined threshold value, the transmitting power will be reduced or no electromagnetic signal is transmitted. If the signal strength of the first mobile communication signal is less than the predetermined threshold value and the second mobile communication signal is received, the electromagnetic signal is transmitted.

With respect to definition of the restricted area and the unrestricted area, the restricted area in the present application refers to an area which is sensitive to electromagnetic compatibility and does not allow transmission of electromagnetic wave or requires reduction of transmitting power. The unrestricted area refers to an area which allows normal transmission of electromagnetic wave. In the restricted area, the electromagnetic wave will influence the electronic equipments and instruments. Therefore, the special purpose mobile communication terminal cannot transmit electromagnetic wave in the restricted area, which can only be used as terminal of a paging system, like a pager. Alternatively, the transmitting power of the special purpose mobile terminal will be reduced so that two-way communication at relatively low transmitting power can be realized in the restricted area. In the unrestricted area, there is no electronic equipment or instrument, or the electromagnetic wave does not influence the electronic equipments and instruments. Therefore, in the unrestricted area, the special purpose mobile communication terminal can transmit electromagnetic wave and can be used as a terminal of a two-way communication system, like mobile phone.

In the illustrated embodiment, the control unit 12 includes a transmission circuit configured to transmit wireless signal. In other embodiments of the present invention, the control unit 12 is separated from the transmission circuit, and the control unit 12 transmits an enable signal to control the transmission of the electromagnetic signal of the transmission circuit or to reduce the transmitting power.

In the illustrated embodiment of the present invention, the control unit 12 is configured to judge the mobile communication signals received by the receiver unit 11. The control unit 12 does not transmit electromagnetic signals if the signal strength of the first mobile communication signal is less than the predetermined threshold value and no second mobile communication signal is received.

When a user holding the special purpose mobile communication terminal of the present invention enters the unrestricted area, corresponding prompt message will be displayed on the screen of the special purpose mobile communication terminal. If the special purpose mobile communication terminal in the restricted area is called, the call cannot be connected. Instead, information, such as the number of the missed phone and the time of calling, will be shown on the screen of the special purpose mobile communication terminal. Alternatively, the transmitting power in the restricted area will be reduced, so that two-way communication can be realized at a relatively lower transmitting power.

In the illustrated embodiment, the receiver unit 11 receives data information transmitted from the base stations in the restricted area and the unrestricted area, and the control unit 12 controls the display of the data information.

In the illustrated embodiment, the control unit 12 includes a display device. In other embodiments of the present invention, the control unit 12 is separated from the actual devices. The control unit 12 controls the display device to display the data information.

Preferably, the control unit 12 includes a voice playing device which can broadcast the data information in a phonetic form.

Additionally, the special purpose mobile communication terminal of the present invention includes a communication interface and an interface circuit which can be connected to an internet. The communication interface and the interface circuit can be wirelessly connected to the internet.

The special purpose mobile communication terminal of the present invention can be widely used by workers in the nuclear power plants, doctors in the hospitals, and teachers in the schools.

In the embodiments of the present invention, the predetermined threshold value refers to a critical value which is set according to the signal strength of the first mobile communication signal being transmitted from the base stations in the restricted area. Specific data of the predetermined threshold value should be set according to actual requirements, which relates to the division and setting of the restricted area and the unrestricted area, as well as relates to the base stations in the restricted area and the unrestricted area.

Figure 2:
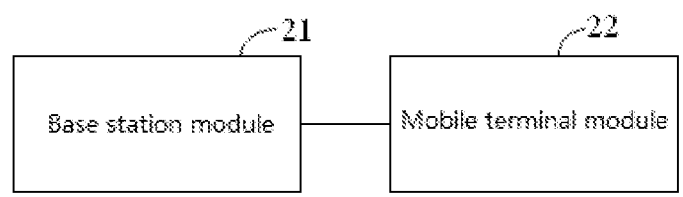
FIG. 2 depicts a schematic block diagram of a special purpose mobile communication system according to one embodiment of the present invention.

FIG. 2 depicts an exemplary block diagram of a special purpose mobile communication system according to one embodiment of the present invention. In the illustrated embodiment, the special purpose mobile communication system includes a base station module 21 and a mobile terminal module 22. The base station module 21 includes base stations respectively transmitting a first mobile communication and a second mobile communication signal in a restricted area and an unrestricted area. The mobile terminal module 22 is configured to receive the mobile communication signals transmitted from the base station module 21 and judge the mobile communication signals being received. In other words, the mobile terminal module 22 is configured to judge the classification of the mobile communication signals being received and signal strength thereof. If the first mobile communication signal is received and the signal strength of the first mobile communication signal is greater than the predetermined threshold value, the transmitting power is reduced or no electromagnetic signal is transmitted. If the signal strength of the first mobile communication signal is less than the predetermined threshold value and the second mobile communication signal is received, the electromagnetic signal is transmitted.

According to one embodiment of the special purpose mobile communication system of the present invention, the mobile terminal module 22 is configured to judge the mobile communication signal received. If the signal strength of the first mobile communication signal is less than the predetermined threshold value and no second mobile communication signal is received, no electromagnetic signal is transmitted.

When a user holding the special purpose mobile communication terminal of the present invention enters a restricted area, corresponding prompt message will be displayed on the screen of the special purpose mobile communication terminal. When the special purpose mobile communication terminal in the restricted area is called, the call cannot be connected. Instead, information, such as the number of missed phone and the time of calling, will be shown on the screen of the special purpose mobile communication terminal. Alternatively, the transmitting power in the restricted area is reduced, so that bidirectional communication can be realized at a relatively low transmitting power.

According to one embodiment of the special purpose mobile communication system, the mobile terminal module 22 is configured to receive data information transmitted from the base stations in the restricted area and the unrestricted area and display the data information.

Additionally, the mobile terminal module 22 includes a voice player device which capable of broadcasting the data information in a phonetic form. Other devices and assemblies which can accurately obtain data information can also be equipped to the mobile terminal module 22 of the present invention.

The mobile terminal module 22 according to the present embodiment has but not limited to, all functions of the special purpose mobile communication terminal in the first embodiment of the present invention.

Figure 3:
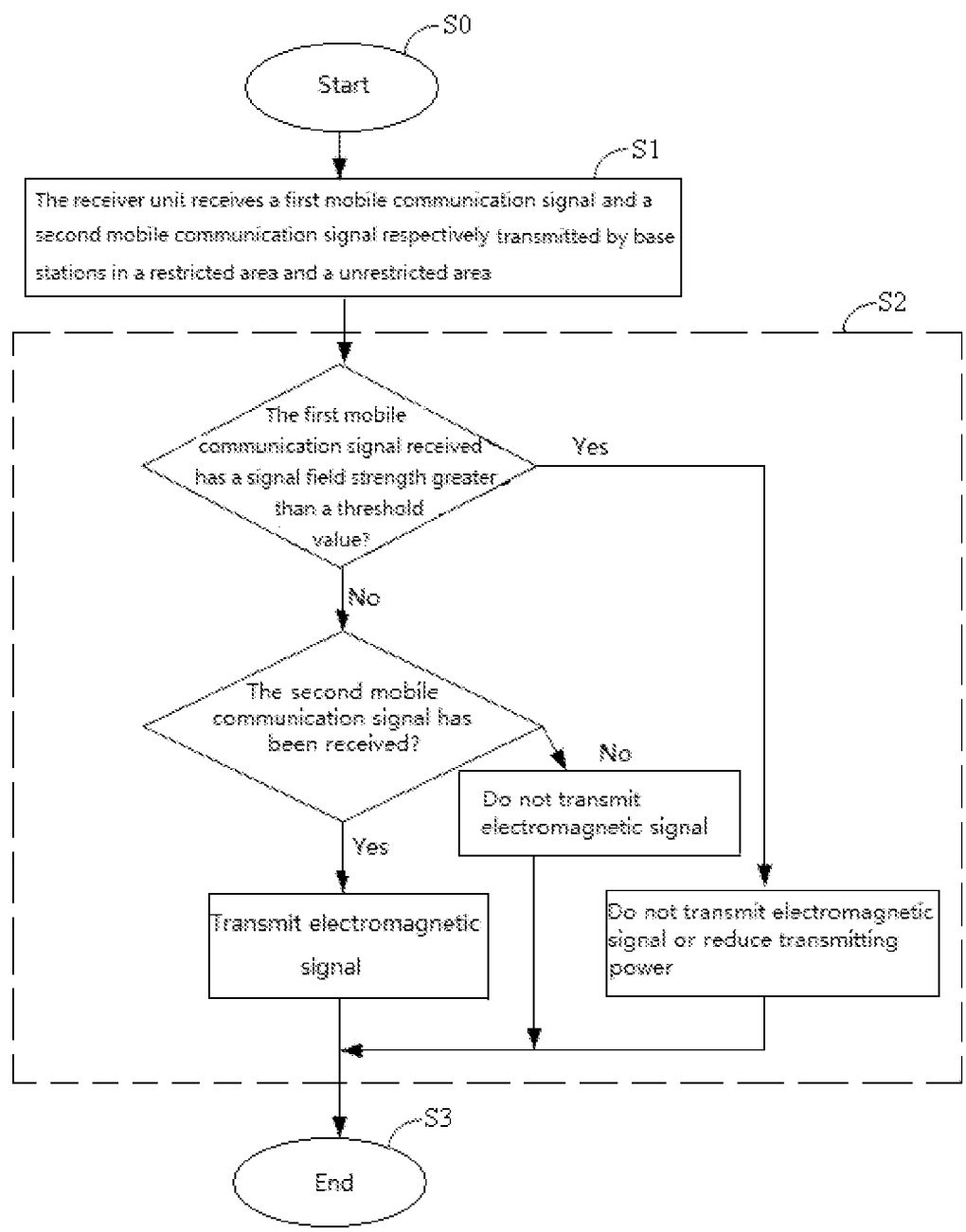
FIG. 3 depicts a schematic block diagram of a special purpose mobile communication method according to one embodiment of the present invention.

FIG. 3 depicts an exemplary block diagram of a special purpose mobile communication method according to one embodiment of the present invention. The special purpose mobile communication method includes the steps of:

Starting step S0: start.

Receiving step S1: The mobile communication terminal receiving a first mobile communication signal and a second mobile communication signal respectively transmitted from base stations in a restricted area and an unrestricted area;

Controlling step S2: Judging the mobile communication signals being received, i.e. judging the classification and the signal strength of the mobile communication signals being received. If the first mobile communication signal is received and signal strength of the first mobile communication signal is greater than a predetermined threshold value, the transmitting power is reduced or no electromagnetic signal is transmitted. If the signal strength of the first mobile communication signal is less than the predetermined threshold value and the second mobile communication signal is received, electromagnetic signal is transmitted. If the signal strength of the first mobile communication signal is less than the predetermined threshold value and no second mobile communication signal is received, no electromagnetic signal is transmitted.

Ending step S3: End.

According to one embodiment of the present invention, in receiving step S1, the mobile communication terminal also receives data information transmitted from the base stations in the restricted area and the unrestricted area. In controlling step S2, the data information is displayed, or the data information is broadcasted via voice broadcast.

The special purpose mobile communication method as previously described can use the special purpose mobile communication terminal according to the first embodiment of the present invention, and can be adapted to the controlling method of the special purpose mobile communication system according to the second embodiment of the present invention as previously described.

When the present invention is applied to a nuclear power plant, the nuclear power plant should be separated into two areas, i.e. the restricted area and the unrestricted area. The restricted area includes a nuclear island, a conventional island, a recirculation pump house and a main switching station. The unrestricted area refers to the remaining areas in the nuclear power plant. The restricted area is provided with a base station for transmission of the first mobile communication signal. The unrestricted area is provided with a base station for transmission of the second mobile communication signal.

When a user holding the special purpose mobile communication terminal of the present invention enters an unrestricted area from a restricted area or enters a restricted area from an unrestricted area, the special purpose mobile communication terminal can realize automatic shift. In the restricted area, the special purpose mobile communication terminal only receives wireless signal and does not transmit wireless signal, thereby only realizing the paging function. No electromagnetic interference can be induced on primary nuclear instruments, secondary protection instruments and DCS systems in the restricted area. Alternatively, the transmitting power is reduced in the restricted area to realize two-way communication with a relatively low transmitting power. In the unrestricted area, the special purpose mobile communication terminal can receive signal and transmit signal, thereby realizing two-way communication as a normal mobile terminal.

According to the present invention, the mobile terminal module or the mobile communication terminal in the restricted area and the unrestricted area can receive broadcasts, multicast and point-to-point text messages transmitted from special control station. At the same time, they can receive broadcasts, multicast and point-to-point text messages transmitted by the special purpose mobile communication terminal in the unrestricted area. The special control station is generally used by special unit or organizations for transmitting specific information to specific staff thereof, for instance, the nuclear power plant's control station controls the transmission of the plant's specific information provided to its staff, the hospital's control station controls the transmission of the hospital's specific information provided to its medical staff.

The special purpose mobile communication terminal can intercommunicate with other terminals provided by the telecom operators in the unrestricted area. In addition, in the restricted area, the special purpose mobile communication terminal can receive broadcasts, multicast and point to point short message transmitted from a terminal provided by the telecom operators.

According to a preferred embodiment of the present invention, in the special purpose mobile communication system and method of the present invention, the mobile terminal module or the mobile communication terminal can be connected to the internet, for instance, can be wirelessly connected to the internet.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments, it should be appreciated that alternative embodiments without departing from the scope of the appended claims. Although specific terms are employed herein, they are used in a generic and descriptive sense only and not for purposes of limitation.

That which is claimed:

1. A special purpose mobile communication terminal, comprising:
   a receiver unit, configured to receive a first mobile communication signal and a second mobile communication signal respectively transmitted from base stations in a restricted area and an unrestricted area; and
   a control unit, configured to judge a signal strength of the mobile communication signals received by the receiver unit by comparing the signal strength of the mobile communication signals to a predetermined threshold value,
   wherein:
      the control unit is configured to at least one of reduce a transmitting power or not transmit an electromagnetic signal if the first mobile communication signal is received and a signal strength of the first communication signal is greater than the predetermined threshold value;
      the control unit is configured to transmit an electromagnetic signal if the signal strength of the first mobile communication signal is less than the predetermined threshold value and the second mobile communication signal is received; and
      the control unit is configured to not transmit an electromagnetic signal if the signal strength of the first mobile communication signal is less than the predetermined threshold value and the second mobile communication signal is not received.

2. The special purpose mobile communication terminal of claim 1, wherein the receiver unit receives data information transmitted from the base stations in the restricted area and unrestricted area, and the control unit controls display of the data information.

3. The special purpose mobile communication terminal of claim 1, further comprising a communication interface being connected to an internet.

4. The special purpose mobile communication terminal of claim 1, wherein the restricted area comprises at least one of a nuclear island, a conventional island, a recirculation pump house, or a main switching station.

5. A special purpose mobile communication system, comprising:
   a base station module, comprising base stations respectively transmitting a first mobile communication signal and a second mobile communication signal in a restricted area and an unrestricted area; and
   a mobile terminal module, configured to receive mobile communication signals transmitted from the base station module and judge a signal strength of the mobile communication signals being received by comparing the signal strength of the mobile communication signals to a predetermined threshold value,
   wherein:
      the mobile terminal module is configured to at least one of reduce a transmitting power or not transmit an electromagnetic signal if the first mobile communication signal is received and a signal strength of the first mobile communication signal is greater than the predetermined threshold value;
      the mobile terminal module is configured to transmit an electromagnetic signal if the signal strength of the first mobile communication signal is less than the predetermined threshold value and the second mobile communication signal is received; and
      the mobile terminal module is configured to not transmit an electromagnetic signal if the signal strength of the first mobile communication signal is less than the predetermined threshold value and the second mobile communication signal is not received.

6. The special purpose mobile communication system of claim 5, wherein the mobile terminal module is configured to receive data information transmitted from the base stations in the restricted area and the unrestricted area and display the data information.

7. The special purpose mobile communication system of claim 5, wherein the restricted area comprises at least one of a nuclear island, a conventional island, a recirculation pump house, or a main switching station.

8. A special purpose mobile communication method, comprising the steps of:
   receiving, via a mobile communication terminal, a first mobile communication signal and a second mobile communication signal respectively transmitted from base stations in a restricted area and an unrestricted area;
   judging a strength of the mobile communication signals being received by comparing the strength relative to a predetermined threshold value;
   if the first mobile communication signal is received and a signal strength of the first mobile signal is greater than the predetermined threshold value, at least one of reducing a transmitting power or not transmitting an electromagnetic signal;
   if the signal strength of the first mobile communication signal is less than the predetermined threshold value and the second mobile communication signal is received, transmitting an electromagnetic signal; and
   if the signal strength of the first mobile communication signal is less than the predetermined threshold value and no second mobile communication signal is received, no electromagnetic signal is transmitted.

9. The special purpose mobile communication method of claim 8, wherein the mobile communication terminal receives data information transmitted from the base stations in the restricted area and the unrestricted area in the receiving step, and the data information is displayed in the controlling step.

10. The special purpose mobile communication method of claim 8, wherein the restricted area comprises at least one of a nuclear island, a conventional island, a recirculation pump house, or a main switching station.

* * * * *